(12) United States Patent
Ting et al.

(10) Patent No.: US 8,973,091 B2
(45) Date of Patent: Mar. 3, 2015

(54) SECURE AUTHENTICATION USING MOBILE DEVICE

(71) Applicant: Imprivata, Inc., Lexington, MA (US)

(72) Inventors: David M. T. Ting, Sudbury, MA (US); Michael C. Bilancieri, Marlborough, MA (US); Edward J. Gaudet, Hanover, MA (US); Jason Mafera, Francestown, NH (US)

(73) Assignee: Imprivata, Inc., Lexington, MA (US)

( * ) Notice: Subject to any disclaimer, the term of this patent is extended or adjusted under 35 U.S.C. 154(b) by 0 days.

(21) Appl. No.: 13/644,143

(22) Filed: Oct. 3, 2012

(65) Prior Publication Data

US 2013/0145420 A1 Jun. 6, 2013

Related U.S. Application Data

(60) Provisional application No. 61/542,443, filed on Oct. 3, 2011.

(51) Int. Cl.
*G06F 17/00* (2006.01)
*H04L 29/06* (2006.01)

(52) U.S. Cl.
CPC ............ *H04L 63/08* (2013.01); *H04L 63/0492* (2013.01)
USPC .......................................................... 726/1

(58) Field of Classification Search
USPC .......................................................... 726/1
See application file for complete search history.

(56) References Cited

U.S. PATENT DOCUMENTS

| | | | |
|---|---|---|---|
| 7,974,606 B2 | 7/2011 | Lo et al. | |
| 2003/0128739 A1* | 7/2003 | Oates et al. | 375/130 |
| 2007/0075133 A1 | 4/2007 | Yeager | |
| 2007/0190939 A1 | 8/2007 | Abel | |
| 2008/0078826 A1 | 4/2008 | Siebers et al. | |
| 2008/0244714 A1 | 10/2008 | Kulakowski et al. | |
| 2008/0289030 A1 | 11/2008 | Poplett | |
| 2009/0170483 A1* | 7/2009 | Barnett et al. | 455/414.2 |
| 2010/0274859 A1 | 10/2010 | Bucuk | |
| 2010/0284315 A1* | 11/2010 | Lee | 370/310.2 |
| 2010/0287606 A1* | 11/2010 | Machani | 726/7 |
| 2011/0021188 A1* | 1/2011 | Tanaka | 455/426.1 |
| 2011/0047594 A1* | 2/2011 | Mahaffey et al. | 726/1 |
| 2011/0112969 A1 | 5/2011 | Zaid et al. | |
| 2011/0200023 A1 | 8/2011 | Murray et al. | |

* cited by examiner

*Primary Examiner* — Kambiz Zand
*Assistant Examiner* — Stephen Sanders
(74) *Attorney, Agent, or Firm* — Morgan, Lewis & Bockius LLP

(57) ABSTRACT

Representative embodiments of secure authentication include receiving, by a server, information from a mobile device identifying (i) the mobile device and (ii) an identifying tag read by the mobile device; accessing, by the server, a database to identify (i) a user associated with the mobile device, (ii) a secure device associated with the identifying tag, and (iii) a security policy associated with the secure device; and if the policy permits access by the identified user to the identified secure device, causing access to the secure device to be accorded to the user.

36 Claims, 12 Drawing Sheets

US 8,973,091 B2

SECURE AUTHENTICATION USING MOBILE DEVICE

CROSS-REFERENCE TO RELATED APPLICATION

This application claims priority to and the benefit of, and incorporates herein by reference in its entirety, U.S. Provisional Patent Application No. 61/542,443, which was filed on Oct. 3, 2011.

FIELD OF THE INVENTION

In various embodiments, the present invention relates generally to computer security and, more specifically, to the authentication of users on a computer system using a mobile device.

BACKGROUND

Computer security in a shared environment—e.g., healthcare or manufacturing—is essential for preventing unauthorized intruders from accessing sensitive or classified information within a computer system. One common authentication method is the use of a password selected by a particular user and stored in the system. Each new log-on session generates a prompt for the user to enter a log-in name and her password; the user is granted access to the computer system and/or network only when the provided information matches the pre-stored data. Although common, the log-in name/password scheme suffers from a variety of security vulnerabilities. For example, the stored information may be insufficiently protected (e.g., by encryption or hashing); and it may be retrieved, and thereafter used, by intruders seeking access to the system. Additionally, if a user is careless with his log-in name and/or password (e.g., by writing the log-in name and/or password in an accessible location, giving this information to an untrustworthy person, or choosing an easily-identifiable password), that carelessness may allow a third party to obtain unauthorized access to the system.

Another authentication method frequently used in computer security is the challenge authentication protocol, which provides a series of challenges and responses that must be correctly answered by a user in order to gain access to the computer system and/or network. However, the challenge and response pairs typically remain unchanged over a long period of time and are generated in the same sequence from session to session. An unauthorized user surreptitiously observing a user during a log-on event can often guess or deduce the proper responses.

Furthermore, authentication methods using either a log-in name and/or password approach or challenge protocols may be time-consuming and frustrating. For example, in healthcare, a doctor on rounds might access her institution's electronic medical records (EMR) system from a computer in the nursing station, from a bedside computer in a patient's room, or from a mobile smart phone/tablet that she carries, and then may proceed to perform a procedure. This sequence is repeated each time the clinician needs access to the EMR and thus demands a cumulatively large amount of time.

A traditional method for accelerating secure computer access requires a user to present a unique identifier (e.g., a radio-frequency identification (RFID) card or a fingerprint) to the computer. This approach, however, requires deployment of a suitable reader for every computer and an identifier card for every user; the cost of the system thereby escalates quickly for enterprises or institutions. Moreover, this and the other authentication methodologies discussed above depend on communications through a network, e.g., an institution's local area network (LAN) or the Internet. If a computer to which access is desired is temporarily or permanently disconnected from the network, authentication may be impossible for a particular user or require unique, local log-in procedures.

Accordingly, there is a need for an authentication approach that provides safe, easy and fast access to the computer, is inexpensive to implement, and can be designed to avoid the need for network communications via the computer to be accessed.

SUMMARY

In various embodiments, the present invention relates to systems and methods for simplifying the authentication process utilizing a mobile device, e.g., a smart phone/tablet capable of executing locally stored applications. In various embodiments, the mobile device is implemented with near-field communications (NFC) that can read from and write to an identifying tag within a short-distance RF activation range. For example, the mobile device may read the tag physically associated with (e.g., worn by, mounted on or proximate to) a person (e.g., a patient) or a secure device (e.g., a computer) that is accessed by the mobile device user. The mobile device may then transmit the read identifier (along with an identifier for the mobile device itself) to an authentication server via wireless cell phone communication and/or Wi-Fi LANs. Once the server identifies the resource to be accessed and confirms the identity of the mobile device user based on the transmitted identifier and mobile device identifier, respectively, access to the resource or a permitted portion thereof can be granted. Moreover, an additional layer of security may be implemented by requiring the mobile device to read a tag associated with a patient before access to that patient's data is granted (unless the mobile device user has broad access privileges). For example, suppose a nurse entering a patient's hospital room seeks access to the patient's records via an in-room terminal. Access may be granted only after the nurse's mobile device reads a badge or tag worn by the patient, whereas a physician may obtain access to the records without this preliminary security step.

Following authentication, the server may conduct wireless or network communication to enable the secure device to provide the user with access to the desired resource; for example, the secure device may grant access based on the server's command or a token that the server provides to the secure device. In one embodiment, the server transmits an authentication credential (e.g., a token) to the mobile device after successfully identifying the user, and the mobile device then delivers this credential to the secure device—via NFC, point-to-point Bluetooth communications, or a conventional network communication—which thereupon grants access to the resource. In another embodiment, the server returns to the mobile device the information about the secure device (e.g., Bluetooth MAC address) to enable the mobile device to directly communicate with the secure device. The use of Bluetooth or NFC may obviate the need for network communications between the mobile device and the secure device.

Security policies may be set at any desired level—e.g., based on the person (physicians being accorded access to the records of all of their patients, for example), the resource, the location, etc., or some combination. For example, the identifying tag may be affixed to an entrance to a room. Once the server successfully identifies the room and the user of the mobile device, access to the room and/or the secure devices located therein may be granted based on a secure policy associated with the room and/or the user. In one embodiment, the authentication policy of the room requires multiple sequential or simultaneous communications between the server and a group of users, each having a registered mobile device. Upon receiving communications from the required multiple mobile devices (in some embodiments, the sequence is critical), the server transmits a message to the agent in the entrance of the room such that an access thereto is granted. The group of users may be located in the same place or different places.

Accordingly, in one aspect, the invention pertains to a method of secure authentication. In various embodiments, the method includes receiving, by a server, information from a mobile device (i) identifying the mobile device and (ii) obtained by the mobile device from an identifying tag. A database is accessed by the server to identify (i) a user associated with the mobile device, (ii) a secure device associated with the identifying tag, and (iii) a security policy associated with the secure device. If the policy permits access by the identified user to the identified secure device, access to the secure device is accorded to the user. In some embodiments, the user is challenged for an authentication factor before the server causes access to the secure device to be accorded to the user.

In one embodiment, access is provided by wirelessly communicating, via wireless cell phone communication, an authentication token to the mobile device for wireless presentation by the mobile device to the secure device. The wireless presentation of the token by the mobile device to the secure device may occur via near-field communication or point-to-point Bluetooth. In another embodiment, the step of causing access includes wirelessly communicating, via wireless cell phone communication, a secure device identifier to the mobile device for enabling the mobile device to directly communicate with the secure device. The secure device identifier may be, for example, a Bluetooth MAC address of the secure device. In another embodiment, access is provided by wirelessly communicating, by the server to the secure device, information about the user of the mobile device for enabling the secure device to authenticate the user without further communication with the server. Alternatively, access may be provided by wirelessly communicating, from the server, an authorization directly to the secure device.

The identifying tag may be, for example, an RFID tag, a bar code, or a quick response code. The information may be received from the mobile device via wireless cell phone communication. In some embodiments, the secure device is located within a room in which a second secure device is located; access to the second secure device is automatically accorded upon access to the first secure device is accorded. In one embodiment, the method further includes challenging the user for a second authentication factor after according the user access to the secure device. In addition, access to the secure device may be accorded only following sequential or simultaneous communications involving a plurality of mobile devices.

In some embodiments, the method further includes receiving, by the server, information from the mobile device identifying a second identifying tag read by the mobile device, accessing, by the server, a second database to identify (i) a person associated with the second identifying tag, and (ii) a second security policy associated with the person, and if the second policy permits access by the user to a third database associated with the identified person, causing access to the third database to be accorded to the user. The third database may store, for example, patient medical histories.

In various embodiments, the method includes terminating access to the secure device. In one implementation, access termination is triggered by receiving, by a server, information from the mobile device identifying (i) the mobile device and (ii) the identifying tag associated with the secure device. In another implementation, access termination is triggered by receiving, by a server, information from a second mobile device identifying (i) the second mobile device and (ii) the identifying tag associated with the secure device. Additionally, access termination may be triggered by a lack of response from the mobile device after the secure device has requested communication therewith.

In another aspect, the invention relates to a method of secure authentication and information transmission. In various embodiments, the method includes receiving, by a server, information from a mobile device (i) identifying the mobile device and (ii) obtained by the mobile device from an identifying tag. A database is accessed by the server to identify (i) a user associated with the mobile device, (ii) a secure device associated with the identifying tag, and (iii) a security policy associated with the secure device. The secure device may be one or more monitors associated with a patient. If the policy so permits, the mobile device obtains vitals information from the monitor(s) patient and transmits, to the server, data identifying the monitor(s) and the obtained vitals information obtained therefrom the monitor. Embodiments may be used, for example, in conjunction with or to provide at-home health security. The invention further relates to systems implementing the foregoing techniques.

Another aspect of the invention relates to a method of secure authentication and printing. In various embodiments, the method includes receiving, by a server, information from a mobile device (i) identifying the mobile device and (ii) obtained by the mobile device from an identifying tag. A database is accessed by the server to identify (i) a user associated with the mobile device, (ii) a secure device associated with the identifying tag, and (iii) a security policy associated with the secure device. The secure device may be a printer, and the method further includes receiving, by the server, information from the mobile device identifying the printer and transmitting, from the server, a list of queued print jobs to the secure device; one or more of the queued print jobs are printed using the printer. The invention further relates to systems implementing the foregoing techniques.

In yet another aspect, a method of secure authentication includes, in various embodiments, receiving, by a server, information from a mobile device (i) identifying the mobile device and (ii) obtained by the mobile device from first and second identifying tags. A database is accessed by the server to identify (i) a user associated with the mobile device, (ii) first and second secure devices associated, respectively, with the first and second identifying tags, and (iii) a security policy associated with the secure devices. If the policy permits access by the identified user to the identified secure devices, access to the secure devices is accorded to the user.

Still another aspect of the invention relates to a method of secure authentication. In various embodiments, the method includes causing communications among a server and multiple mobile devices; determining, by the server, whether the communications satisfy a policy; and if so, according access to a secure resource to one or more individuals associated with one or more of the mobile devices. The multiple mobile devices may communicate with the server simultaneously or sequentially.

In another aspect, the invention relates to an authentication system. In various embodiments, the system includes a server for receiving information from a mobile device identifying (i)

the mobile device and (ii) an identifying tag read by the mobile device and a database including records (i) associating users with mobile devices, (ii) associating secure devices with tag identifiers, and (iii) defining a security policy associated with the secure devices. The server includes a processor for (i) accessing the database upon receipt of the information from the mobile device, (ii) determining based thereon whether a security policy applicable to the user associated with the mobile device is entitled to access the secure device associated with the identifying tag, and if so, (iii) facilitating access to the secure device by the user. The server may be configured to wirelessly communicate with the mobile device via cell phone communication. In addition, the server may be configured to communicate with the secure device via a computer network. The identifying tag may be, for example, an RFID tag, a bar code, or a quick response code.

In still another aspect, an authentication system includes a server for receiving information from a mobile device identifying (i) the mobile device and (ii) an identifying tag read by the mobile device, a secure device configured for local wireless communication with the mobile device, and a database including records (i) associating users with mobile devices, (ii) associating the secure device with one or more tag identifiers, and (iii) defining a security policy associated with the secure device. In various embodiments, the server includes a processor for (i) accessing the database upon receipt of the information from the mobile device, (ii) determining based thereon whether a security policy applicable to the user associated with the mobile device is entitled to access the secure device associated with the identifying tag, and if so, (iii) facilitating access to the secure device by the user. The mobile device may communicate with the secure device via point-to-point Bluetooth or near-field communication. The identifying tag may be, for example, an RFID tag, a bar code, or a quick response code.

In another aspect, the invention pertains to a wireless mobile device. In some embodiments, the mobile device includes a processor for executing a first procedure for reading an identifying tag associated with a secure device, executing a second procedure for transmitting information from the identifying tag and information identifying the wireless mobile device to a server, executing a third procedure for receiving an authentication token from the server, and executing a fourth procedure for causing obtaining access to the secure device using the token. In one implementation, the identifying tag is read using near-field communication.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

As used herein, the term "mobile device" refers to a "smart phone" or tablet with advanced computing ability that, generally, facilitates bi-directional communication and data transfer, and is capable of executing locally stored applications. Mobile devices include, for example, IPHONES (available from Apple Inc., Cupertino, Calif.), BLACKBERRY devices (available from Research in Motion, Waterloo, Ontario, Canada), or any smart phones equipped with the ANDROID platform (available from Google Inc., Mountain View, Calif.) and tablets, such as IPAD and KINDLE FIRE.

Because mobile devices are in general uniquely associated with a specific user, they may act as an authentication token for identifying the user. For example, an authentication server may have (or have access to) a database associating mobile-device identifiers, mobile-device users, and privilege levels for those users. Should an extra level of security be desired to ensure that the user of the mobile device is, in fact, the registered individual, the server and/or the mobile device may require the user to enter a password into the mobile device when it is powered up or idled longer than a pre-set period of time, and this password is transmitted to the server either immediately or at the time the user requests access to a secure device. User/password combinations may be stored as further records in the authentication database.

Figure 1A:
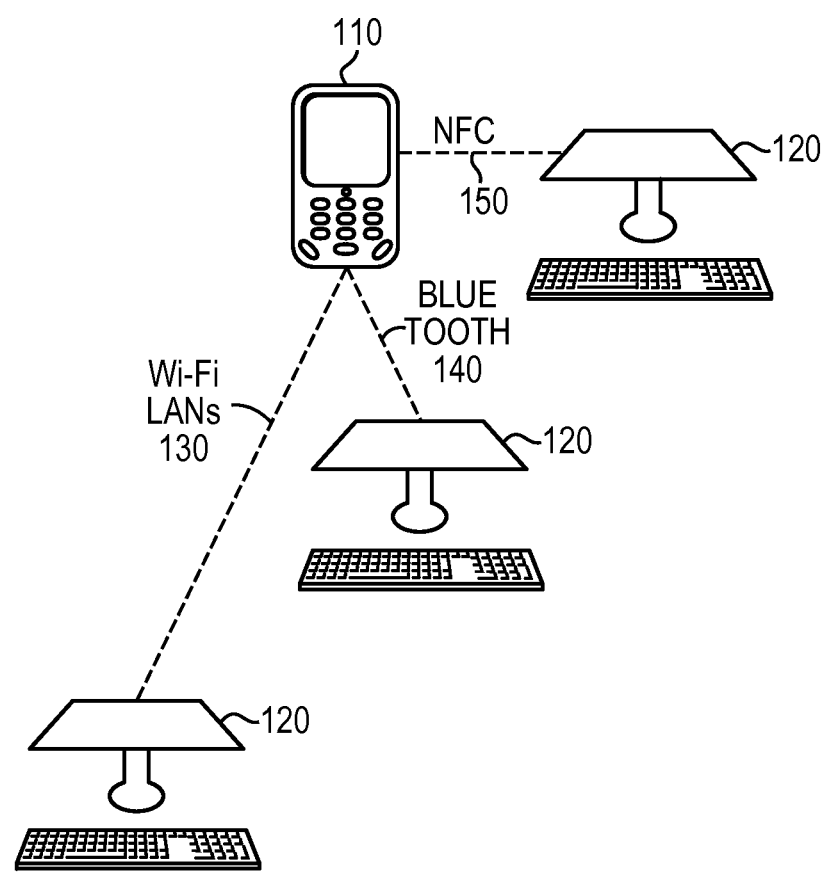
FIG. 1A illustrates a mobile device communicating with a secure device using a Wi-Fi LAN, a Bluetooth wireless connection, or an NFC channel.

In addition, an integrated mobile device can support multiple communication channels for exchanging multimedia and other data with, e.g., computers, servers and other devices. FIG. 1A depicts a mobile device 110 capable of communicating with a secure device 120 (e.g., a computer) using, e.g., a Wi-Fi LAN 130 for Internet access (with a representative range of 32 m), a short-range Bluetooth wireless connection 140 for point-to-point access (with a representative range of 5-10 m), and/or an NFC channel 150 for close-proximity access (with a representative range of 10 cm). The activation distance of an NFC can be as short as 4 cm, thereby eliminating the data confusion that can occur when multiple signal receivers communicate with a Bluetooth mobile device.

Figure 1B:
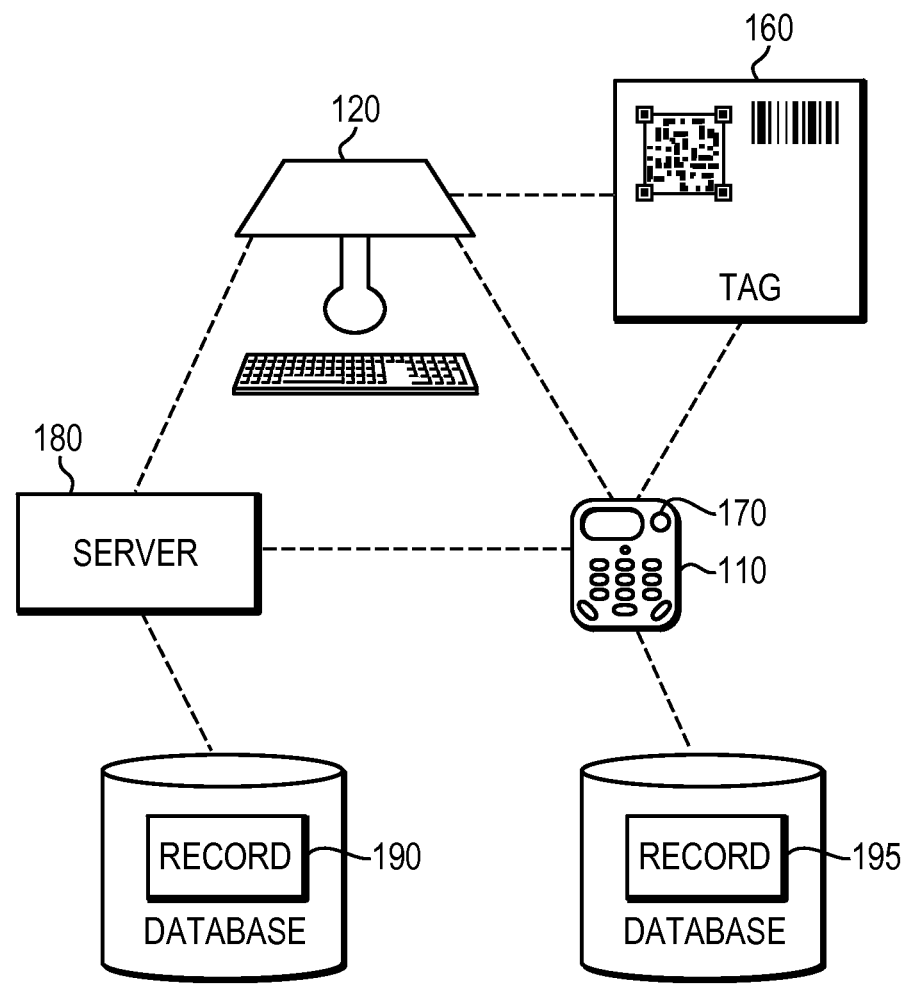
FIG. 1B illustrates communications between a mobile device, a secure device, and a server in accordance with an embodiment of the invention.

Referring to FIG. 1B, in various embodiments, the secure device 120 is affixed with an identifying tag 160 that identifies the secure device 120. For example, the identifying tag 160 may be an RFID tag; introduction of the NFC capability into the mobile device 110 enables it to read from and write to the RFID tag, simply by moving the mobile device 110 within the RF activation range. Alternatively, the identifying tag 160 may be a bar code, a quick response (QR) code, or other visual representation; an internal camera 170 built into the mobile device 110 can quickly take a picture of the code and then extract the encoded information about the secure device 120 using a conventional, on-board reader application. In one implementation, the secure device 120 includes an agent (e.g., an administrator or, more typically, a program running on the secure device 120 and implementing the access and screening functions described herein) to communicate with the mobile device 110 and/or a server 180.

Figure 2:
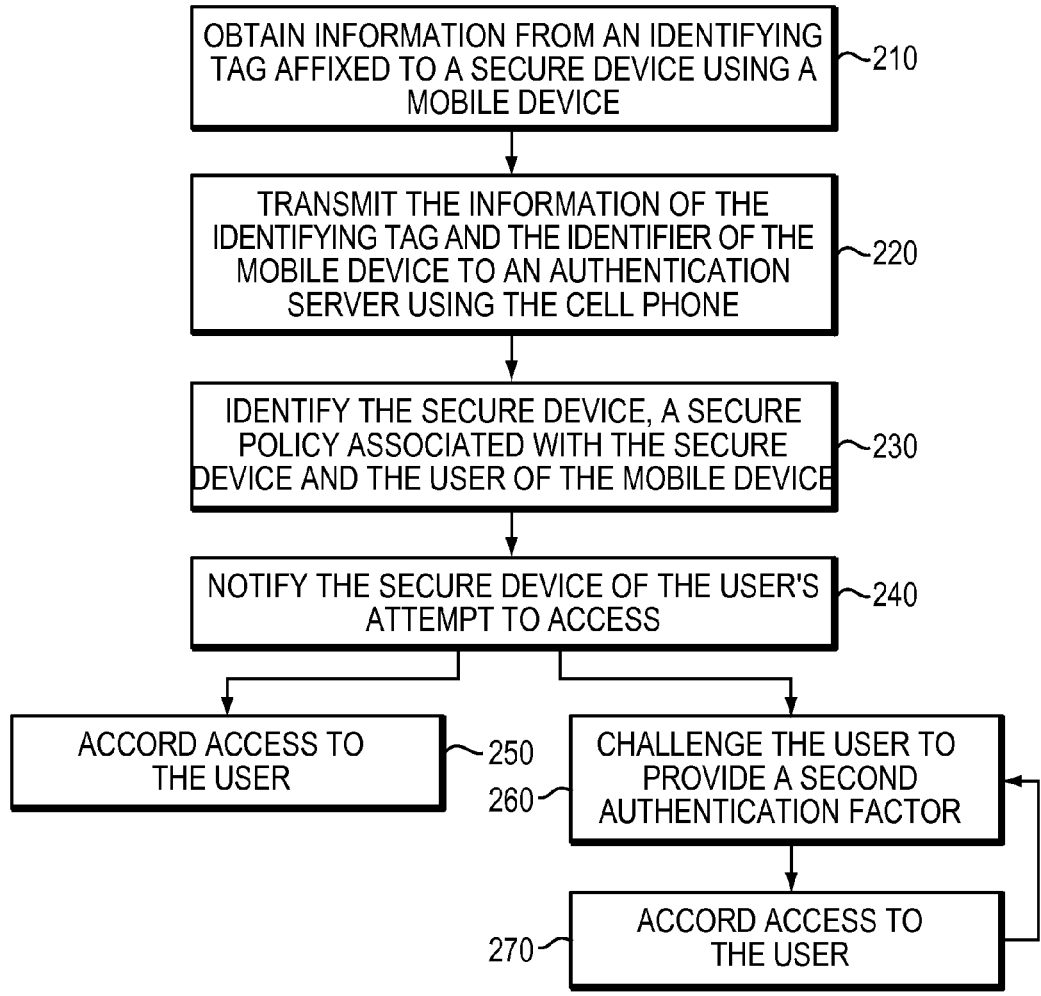
FIG. 2 depicts a secure authentication approach in accordance with an embodiment of the invention.

Referring to FIGS. 1B and 2, in some embodiments, the log-in process of the secure device 120, network, and/or database is initialized by bringing an NFC-enabled mobile device 110 into proximity with the identifying tag 160 affixed to the secure device 120 (step 210). In a second step 220 of the embodiment under discussion, the mobile device 110 reads and/or decodes the information about the secure device 120 obtained from the identifying tag 160 and transmits this information together with the identifier of the mobile device 110 to an authentication server 180, using either wireless communication or Wi-Fi LANs of mobile device 110 and/or Bluetooth via the secure device 120. The server 180 uses the tag ID to identify the secure device 120 (e.g., its IP or MAC address, or hostname) from a database record 190 generated when the tag 160 was initially assigned to the secure device 120 (step 230) and a security policy associated with the secure device 120. Similarly, the user (i.e., username) of the mobile device 110 may be identified by reference to a database record 195 generated when the device 110 was initially assigned or bound to the user (step 230).

After the identities of the secure device 120 and user have been established and it is determined that the user is authorized to access the requested resource, the server 180 may have several options to accord access. In one embodiment, using the identified IP address of the secure device 120, the server 180 directly notifies the agent on the secure device 120 that the user is trying to log in to the system and has presented one authentication factor (i.e., the mobile device 110) (step 240). The agent of the secure device 120 may or may not exist as a running process on the secure device 120 prior to the authentication process. For example, the secure device 120 may retrieve (e.g., from the server 180 or even from the mobile device 110) an agent program that communicates with the server 180 and/or mobile device 110 once the mobile device 110 has been swiped or tapped on the identifying tag 160. Upon receiving the information from the server 180, the now-running agent on the secure device 120 can either grant access based on the presence of the first factor (i.e., the device 110) (step 250) or, if a higher level of security is appropriate, may further challenge the user to provide a second authentication factor (e.g., a PIN, password, or fingerprint) (step 260). Once the user successfully presents the second authentication factor, the agent completes the authentication process and grants the user access to the secure device 120 (step 270). Although embodiments described herein focus on identifying tags that can be read using an NFC-enabled mobile device, it should be understood that the identifying tags that are a visual representation (e.g., a bar codes or a QR code) of information readable by a conventional mobile device are within the scope of the present invention.

Figure 3A:
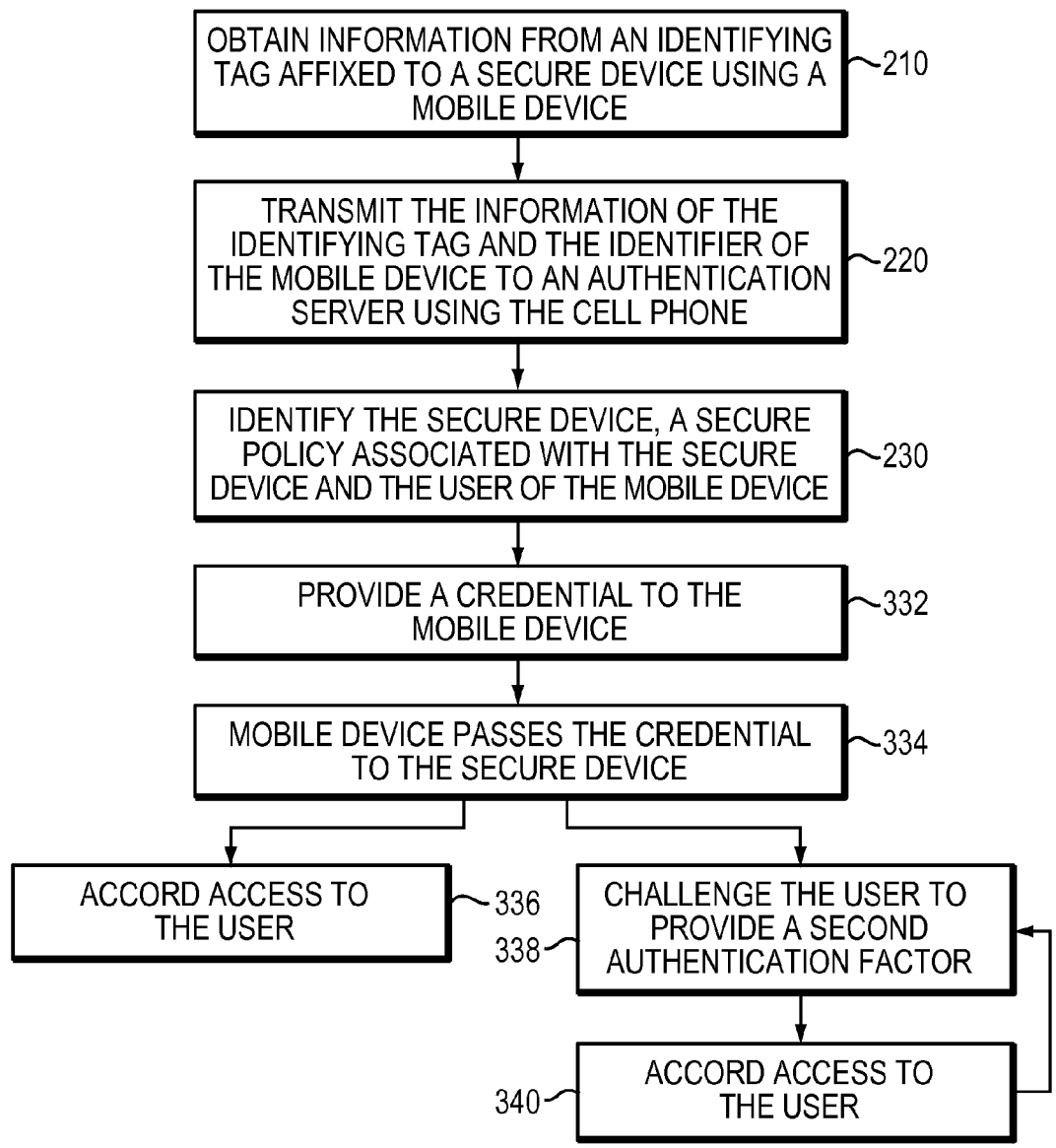
FIGS. 3A, 3B, 3C, and 3D depict various approaches for according access to the secure device in accordance with various embodiments of the invention.

Referring to FIG. 3A, in one embodiment, upon successful authentication, the authentication server 180 provides the mobile device 110 (e.g., via cellular communication) with an appropriate credential (e.g., a secure token) indicating that the user has a trusted device (step 332). The mobile device 110 then passes this credential to the secure device 120 via, for example, NFC or point-to-point Bluetooth communications (step 334); the secure device 120 thereupon accords access (step 336) or challenges the user to provide a second authentication factor (step 338). After receiving a valid second authentication factor, the agent on the secure device 120 grants access to the mobile device user (step 340).

Figure 3B:
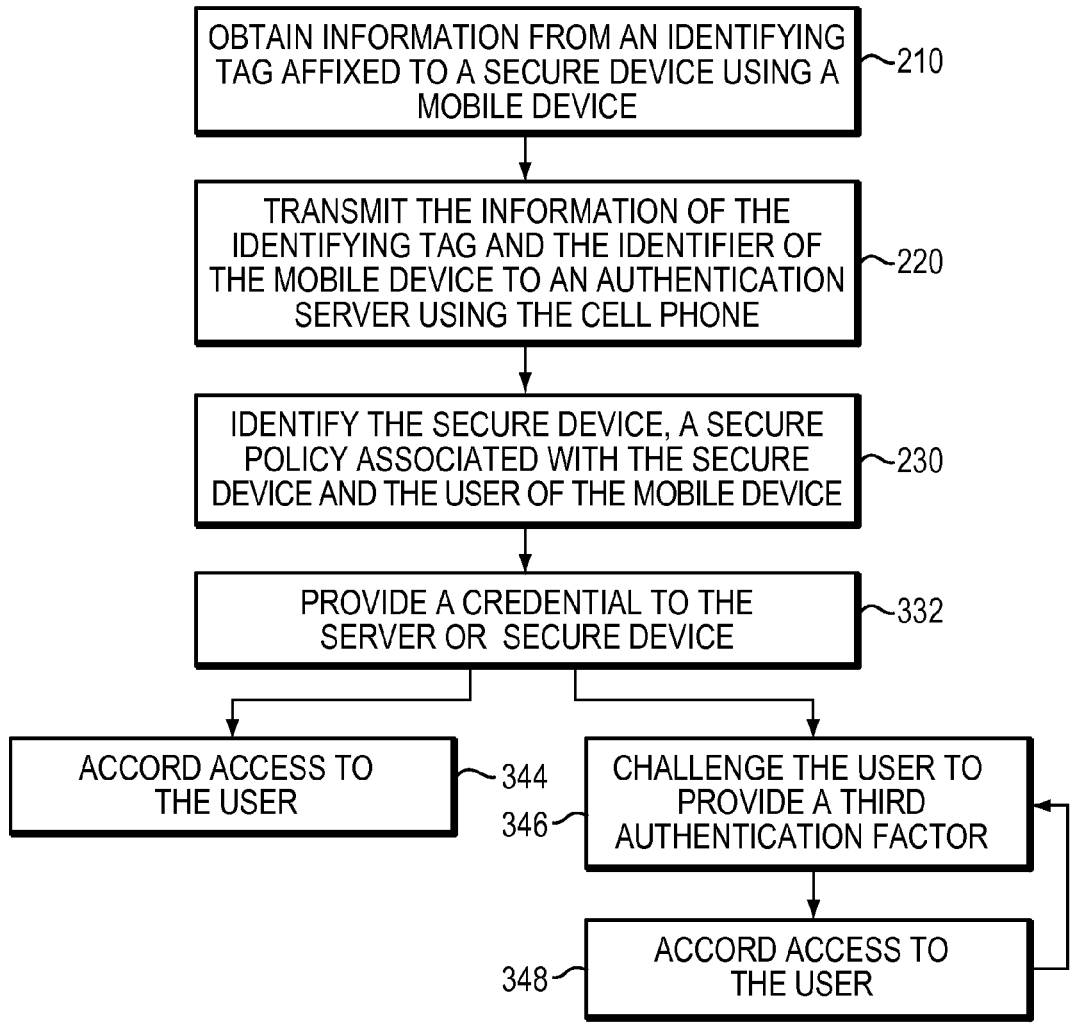

In another embodiment, with reference to FIG. 3B, upon receiving the identified information about the secure device 120, an agent executing as a running process on the mobile device 110 challenges the user to provide a second authentication factor (e.g., a PIN). After receiving a valid second authentication factor, the agent on the mobile device 110 provides a signed digital certificate to the secure device 110 or the server 180 (step 342). For example, the agent on the mobile device 110 may pass the certificate to the secure device 120 using point-to-point Bluetooth or other wireless communication. Upon receiving the valid certificate, the agent of the secure device 120 grants access to the mobile device user immediately (step 344) or after the user successfully provides a third authentication factor (steps 346, 348) as described below.

Figure 3C:
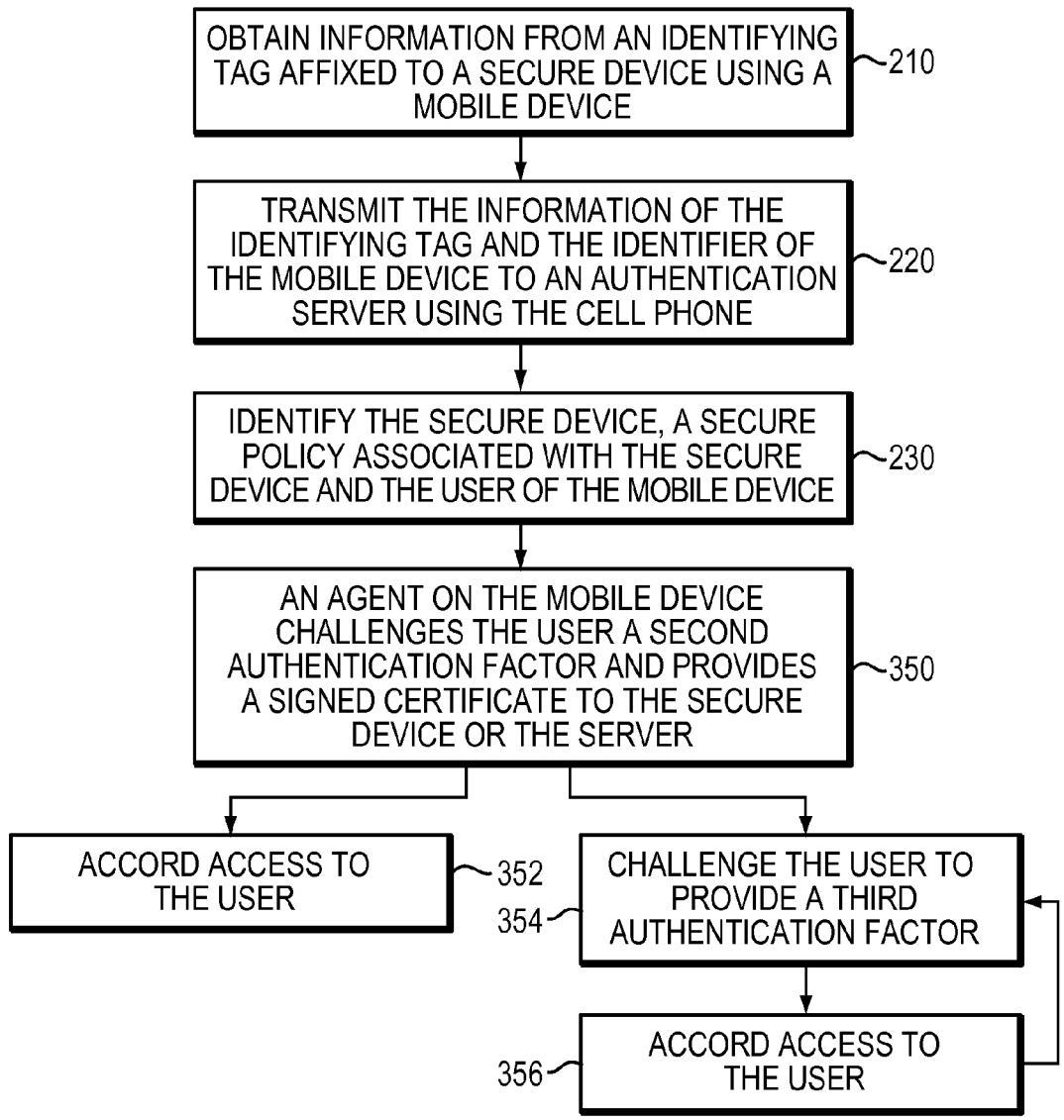

Referring to FIG. 3C, in some embodiments, the authentication server 180 generates an appropriate credential (e.g., a token) and directly passes this credential to the secure device 120—using, for example, network communication or, if in proximity to the secure device 120, point-to-point Bluetooth—to indicate that the user has a trusted phone (step 350); upon receiving the credential, the agent of the secure device grants access to the user of the mobile device (step 352). The agent of the secure device 120 may also challenge the user to provide a second authentication factor (step 354), according access upon receiving the second valid factor (step 356). As described above, the use of Bluetooth may obviate the need for network communication by the secure device 120 to which the access is sought. It should be understood, however, that references herein to Bluetooth are exemplary; other secure wireless protocols, involving NFC or longer-range communications, may be used instead.

It should be noted that the terms "security token" and "digital certificate" herein refer broadly to well-characterized protocols for authenticating or identifying a user, device or transaction using, for example, cryptographic keys.

Figure 3D:
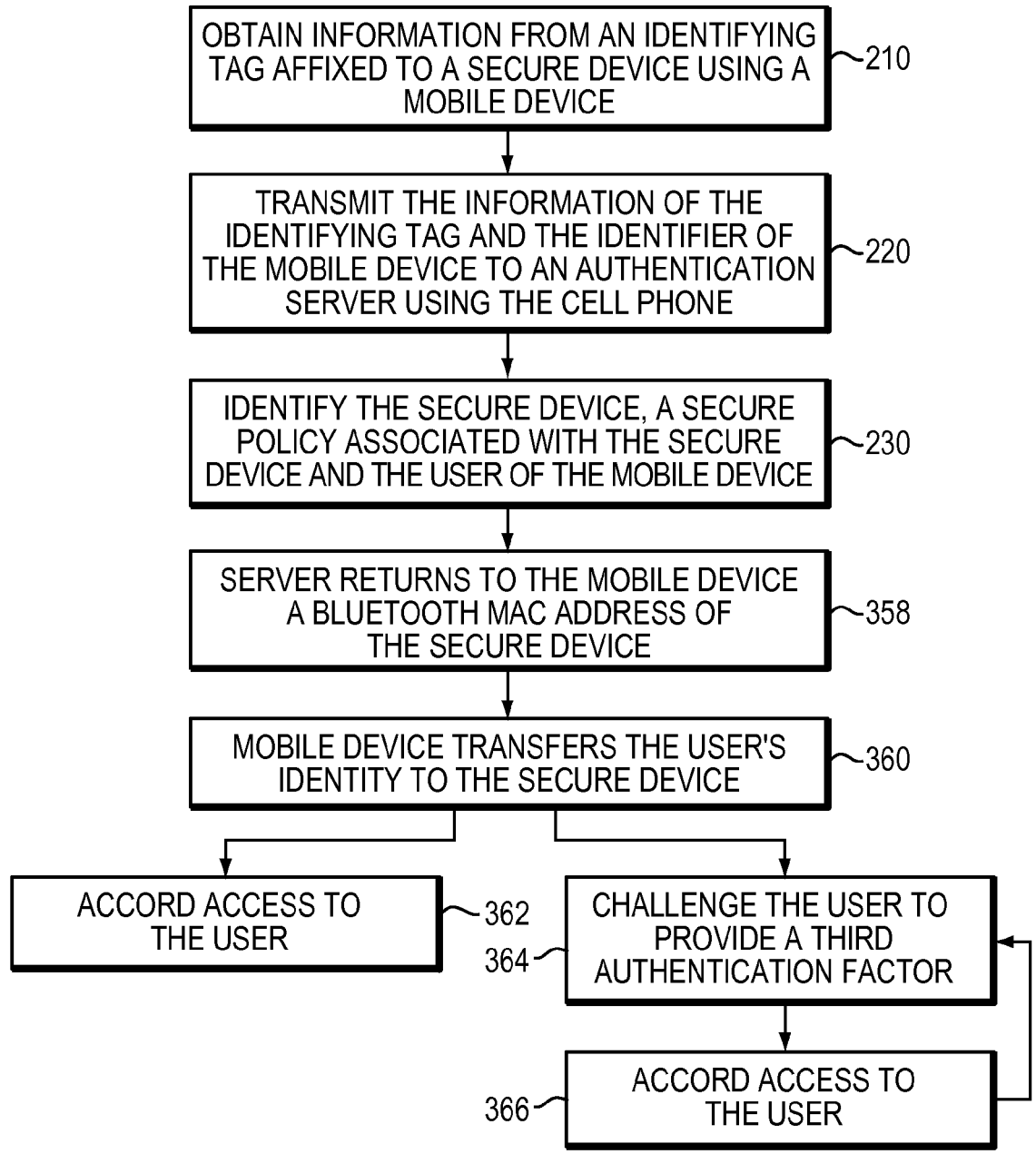

Referring to FIG. 3D, in another embodiment, upon authenticating the user and verifying authorization to access the resource in the secure device 120, the server 180 returns to the mobile device 110 (via wireless cell phone communication) a Bluetooth MAC address of the secure device 120 (step 358); this enables the mobile device 110 to directly connect to the secure device 120 via point-to-point Bluetooth communications. Once secure Bluetooth (or other secure wireless) communication between the secure device 120 and the mobile device 110 is established, the mobile device 110 transfers the user's identity (obtained from the server 180 or directly from the mobile device 110) to the agent running on the secure device 120 (step 360). The agent can then either accord access to the user upon receiving the information (step 362) or challenge the user for a second authentication factor (step 364). After a valid second authentication factor has been presented, the agent completes the authentication and grants access (step 366). Accordingly, once the communication between the mobile device 110 and the secure device 120 is established, the communication between the server 180 and the mobile device 110 and/or the secure device 120 may be entirely eliminated and the user authentication processed locally.

Referring again to FIG. 1B, as described above, the authentication process in the present invention may be expedited by utilizing communication between the mobile device 110, identifying tag 160, server 180, and/or the secure device 120. It eliminates the need for the user to type in a username and a complex password, select a domain, and then click the "okay" button to start the process. In addition, the current invention may improve log-on security by enforcing a multi-factor authentication policy requiring, for example, a mobile device 110 and/or a second factor (e.g., a PIN). Whether a second factor is required for log-on may be set by the system administrator in the form of a policy implemented by the server 180, e.g., as record entries in the database 190 that determine actions taken by the secure device 120. For example, the server database 190 may contain records corresponding to various resources and the authentication policies associated with them; these policies may, in some implementations, vary with the user seeking access, and may be propagated to the various agents via network communications for enforcement by the secure devices 120. Thus, entry of a PIN on the mobile device 110 may form the basis of (or trigger) the signed challenge sent by the mobile phone 110 to the server 180 in the initial notification. If the security policy in effect for the user, the location, the resource, etc. requires a third authentication factor (e.g., further information from the user), the NFC-enabled mobile device 110 may obtain the needed additional information by, e.g., reading the user's identifier tag or badge, and then transmit this information to the server 180 for identification; this further increases the strength of the authentication.

The logged-in user may be optionally challenged by either the operating system or the application running within the secure device 120 for re-authentication while the user is still logged into the system. This routine may be used, for example, to ensure that the secure device 120 is not left unattended or to complete a sensitive transaction (e.g., a prescription order). In some embodiments, the logged-in user responds to the challenge by tapping the mobile device 110 on the identifying tag 160 or on the user's identifier tag or badge. The information is transmitted wirelessly to the secure device 120, and the agent thereon recognizes it as indicating a re-authentication attempt; in response, it initiates a re-authentication process similar to that of the first authentication but without terminating the current access. During re-authentication, the mobile device 110 may perform digital signing of critical content with a stored digital certificate to ensure the integrity of a transaction. This procedure may be utilized, for example, to satisfy the digital signing requirements for the Drug Enforcement Agency's Electronic Prescription of Controlled Substances regulation, which requires the contents of electronic prescriptions for controlled substances to be digitally signed using a certificate belonging to a registered user.

Figure 4A:
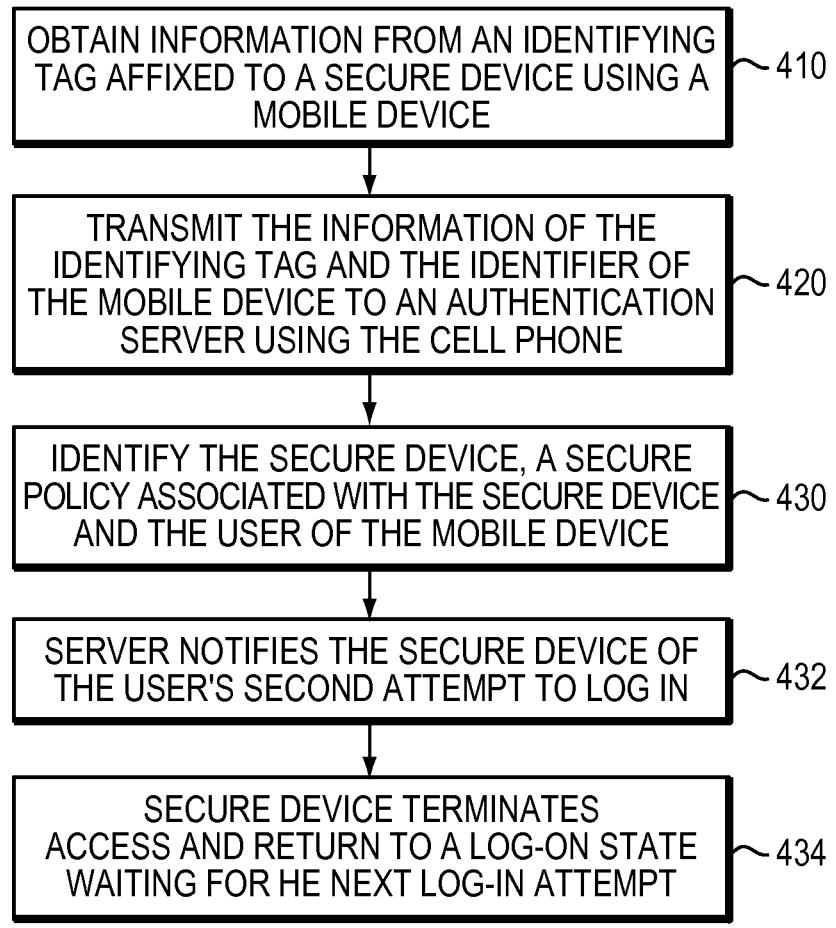
FIGS. 4A, 4B, and 4C depict various approaches for terminating access to the secure device in accordance with some embodiments of the invention.

Termination of access at an appropriate time is crucial for protecting the security of the secure device, network, and/or database. In various embodiments, termination may utilize a procedure similar to that of the log-in. With reference to FIG. 4A, the mobile device 110 may be again swiped or tapped on the identifying tag 160 to initiate a log-off process from the secure device 120 (step 410). The mobile device 110 then sends to the server 180 the information from the identifying tag 160 identifying the secure device 120 and mobile device 110 (step 420); the server 180 thereupon retrieves the identity of the secure device 120 (e.g., hostname and/or IP address) and the user (e.g., username) associated with the mobile device 110 (step 430). In one embodiment, the server 180 directly notifies the secure device 120 (by wired or wireless network communication, for example) of a second authentication attempt by the same user (step 432). Upon receiving the request from the same user who currently has access to the secure device 120, the agent running on the secure device 120 terminates access and returns to a log-on state waiting for the next log-in attempt (step 434).

Figure 4B:
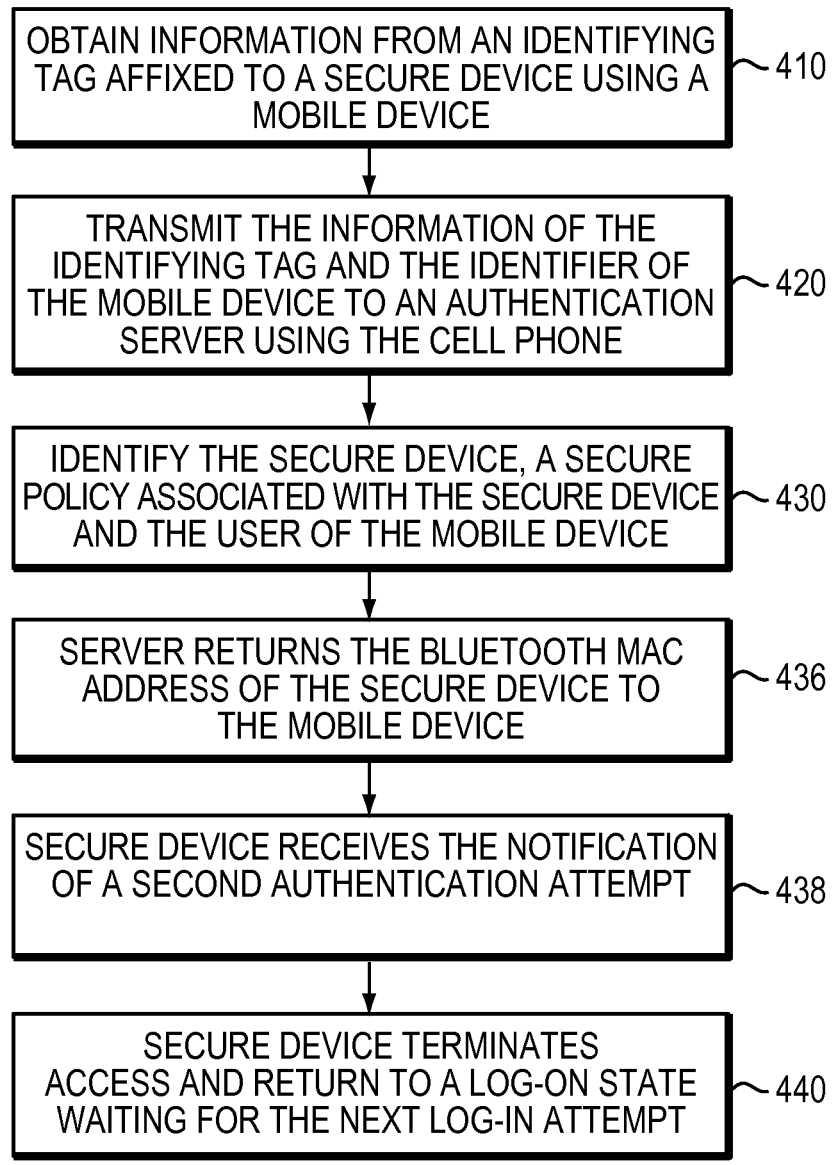

In another embodiment, with reference to FIG. 4B, the server 180 returns the Bluetooth MAC address of the secure device 120 to the mobile device 110 so that the mobile device 110 can directly connect with the agent on the secure device 120 via point-to-point Bluetooth communications (step 436). When the agent receives notification of a second authentication request to log into a system to which access has already been granted to the same user (step 438), the agent may terminate the access, return to the log-on state and wait for the next log-in attempt (step 440). In some embodiments, access termination is triggered when the mobile device 110 leaves the Bluetooth or RF detection ranges for a certain amount of time. For example, the agent may terminate access due to a lack of response from the mobile device 110 after the secure device 120 has requested communications therefrom; such requests may be issued periodically to prevent the secure device 120 from remaining accessible when the user leaves it unlocked and simply walks away.

Figure 4C:
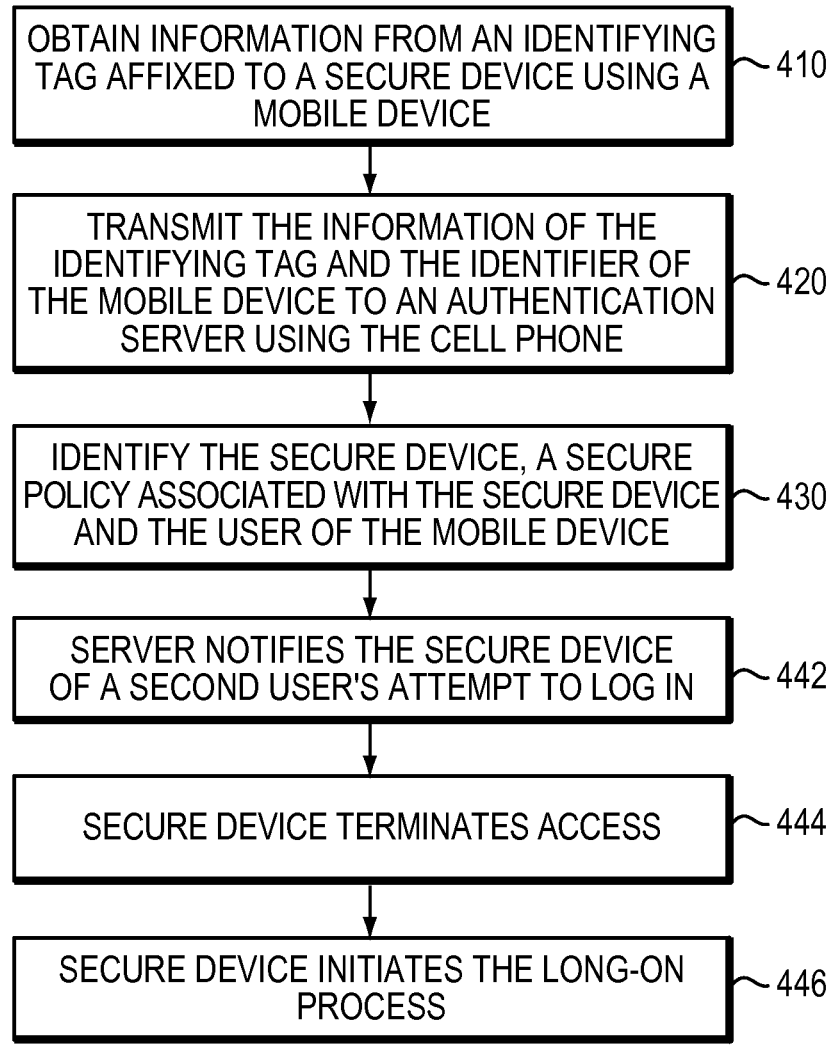

Occasionally, a first logged-in user may leave the secure device 120 without logging off, and while he is gone, a second user may arrive and request access. In one embodiment, the server 180 notifies the secure device 120 of the second user's attempt to access an already logged-in session, as shown in step 442 of FIG. 4C. Upon receiving the notification, the agent on the secure device 120 logs the first user off (step 444) and initiates the log-on process as described above for the second user (step 446).

Figure 5:
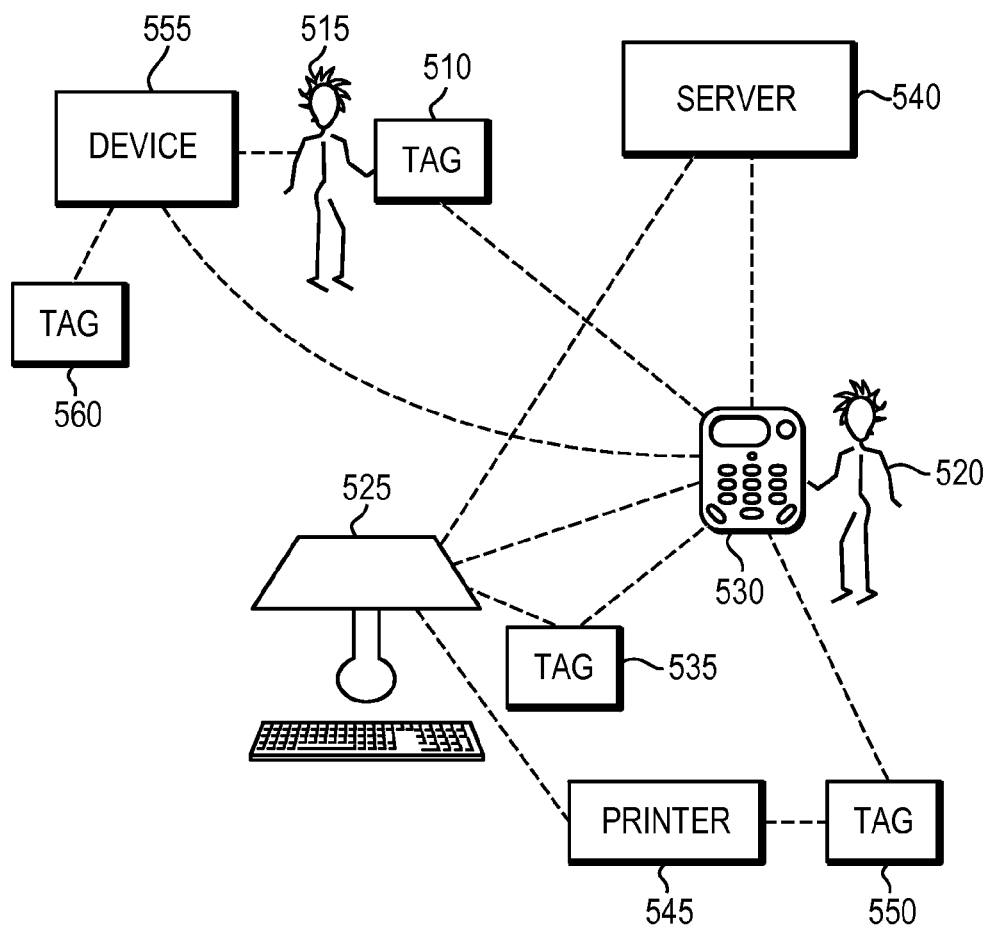
FIG. 5 depicts identifying a person and device that monitors the person and/or delivers drug treatments to the person using the identifying tag in accordance with an embodiment of the invention.

Referring to FIG. 5, the identifying tag 510 or other smart sensors may be worn by a person 515 (e.g., a patient), allowing the person 515 to be identified during an authentication procedure. For example, to enable a clinician 520 to gain access not only to a secure device 525 located in her office or in the patient's room, but also to records indexed by the patient ID (i.e., the Medical Record Number or MRN), the clinician 520 may tap his/her mobile device 530 near the identifying tags 510, 535 worn by the patient 515 and secure device 525, respectively. The mobile device 530 then transmits the information along with the identifier of the mobile device itself to a server 540. After the server establishes the identities of the clinician 520, secure device 525, and the patient 515 and determines that the clinician 520 is entitled to access the secure device 525 and the patient's medical records, the server 540 accords access to the clinician utilizing the approaches as described above. This approach enables the clinician 520 to access the patient's medical records easily and quickly. Additional medical data (e.g., the symptoms and treatments) from the current visit may also be transmitted and recorded in the patient's medical records stored in the server 540, the secure device 525, or other devices. In some embodiments, the clinician 520 is authenticated and granted access to a printer 545 by placing the mobile device 530 near an identifying tag 550 attached to the printer 545. Upon successfully identifying the clinician 520 and the printer 545, the server 540 responds with a list of queued print jobs (e.g., prescriptions) displayed on the secure device 525; the clinician 520 can then select one or more jobs and print them using the identified printer 545. This approach provides a fast and secure approach to distributed printing.

The mobile device 530 may further communicate with devices 555 that monitor the "vitals" of patient 515, receiving data from these devices and send the data to the server 540 which accepts them because the clinician 520 has been authenticated. A security/trust model may be introduced to ensure the integrity of the vitals as they are captured by the mobile device 530. In one implementation, an identifying tag 560 is affixed to devices 555 that deliver drug treatments to the patient 515; the server 540 identifies these devices 555 based on the information transmitted from the identifying tag 560 using the mobile device 530. The server 540 then enables a treatment procedure saved in the mobile device 530 and/or secure device 525 to be automatically conducted in the devices 555.

Figure 6:
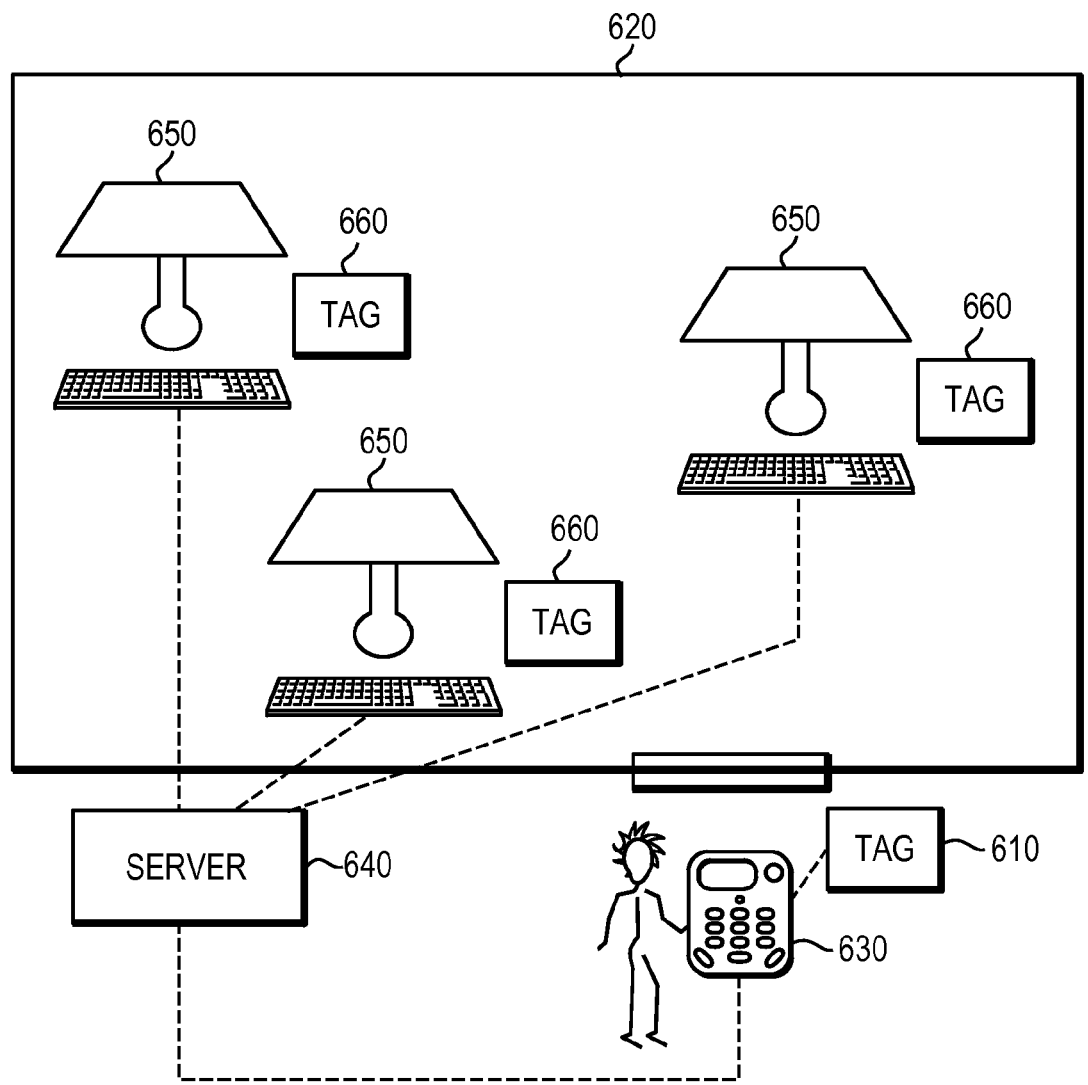
FIG. 6 depicts according access to a room to a user.

In the embodiment shown in FIG. 6, an identifying tag 610 is placed at the entrance of a room 620 (e.g., a patient's room or a radiology exam room). The user first taps the mobile device 630 on the tag 610; once the server 640 grants the user access to the room 620, multiple secure devices 650 located within the patient room may be simultaneously authenticated. Accordingly, an authentication procedure as described above may be initiated via the mobile device 630, but the authentication transmitted by the server 640 may affect multiple secure devices 650 associated with the identifying tag 610 simultaneously. For example, the secure devices 650 located within the room 620 may be networked together such that authentication on one secure device propagates among them. In another embodiment, a second identifying tag 660 is attached to at least one of the secure devices 640; again, once access to the tagged secure device is granted, some or all of the other secure devices located in the same room 620 can be accessed by the same user (i.e., the server 640 sends commands to these devices according access to the user).

In addition, while agents on all of the secure devices 650 in the room 620 are notified of the successful single-factor authentication, some or all of the secure devices 650 may nonetheless require a second authentication factor before the user is accorded access thereto. For example, if the user responds with the correct PIN or password on one secure device, all the others within the group may automatically grant access to the user. Similarly, an exit swipe may lock and/or disconnect all secure devices 650 simultaneously. In some embodiments, the authentication policy to enter the room 620 requires sequential or simultaneous communications involving the server 640 and multiple NFC-enabled mobile devices 630 before access is granted. For example, it may be necessary for a surgeon, an anesthesiologist, a nurse, and an assistant to be together to perform a surgical procedure; the system may be configured to require the mobile devices 630 of these individuals to cooperate in order to generate a valid authentication token. This authentication token then allows the group to enter the surgery room 620. In some embodiments, the mobile devices communicate with each other to generate the token; in other embodiments each mobile device communicates with the server 640, which accords access only after all necessary participants—i.e., individuals the server recognizes as collectively satisfying the required set of clinical roles for the procedure—have "checked in" via their mobile devices; and in still other embodiments group authentication occurs with the participation of both the server and the mobile devices. For example, the server 640 may issue a special token to the first mobile device it authenticates. The token is generated based on the access policy, which requires the presence of a specific group of personnel before access is granted. Each time the first mobile device detects the presence of another necessary participant via his mobile device, it modifies the token, which becomes valid only after local communication with all necessary participants (via their devices) has taken place. Access policies therefore flexibly be adapted to require any particular combination of personnel and, if desired, signal transmission order by the mobile devices 630. It should also be noted that the group of users may not necessarily be located in the same place; for example, the presence of a necessary participant somewhere within the institution, rather than in the immediate vicinity of the access-seeking user, may suffice.

The various authentication and communication routines described above may be implemented, on the server and in the mobile device, by computer-executable instructions, such as program modules, that are executed by a conventional computer processor. Generally, program modules include routines, programs, objects, components, data structures, etc. that performs particular tasks or implement particular abstract data types. Those skilled in the art will appreciate that the server may be implemented using any number of various computer system configurations, including multiprocessor systems, microprocessor-based or programmable consumer electronics, minicomputers, mainframe computers, and the like. The server may also be realized in distributed computing environments where tasks are performed by remote processing nodes linked through a communications network. In a distributed computing environment, program modules may be located in both local and remote computer-storage media including memory storage devices.

Thus, the server may comprise or consist of a general-purpose computing device in the form of a computer including a processing unit, a system memory, an interface for wireless and/or wired network communications, an interface facilitating wireless cell phone communications via telecommunication carriers, and a system bus that couples various system components including the system memory to the processing unit. Computers typically include a variety of computer-readable media that can form part of the system memory and be read by the processing unit. By way of example, and not limitation, computer-readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPEN-STEP operating system or another operating system of platform.

Any suitable programming language may be used to implement without undue experimentation the analytical functions described above on the authentication server, the mobile device, and the secure computer or device. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The authentication server and database, the mobile device, and the secure computer or device may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing units that execute commands and instructions may be general-purpose processors, but may utilize any of a wide variety of other technologies including special-purpose hardware, a microcomputer, mini-computer, mainframe computer, programmed microprocessor, microcontroller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices that is capable of implementing the steps of the processes of the invention.

What is claimed is:

1. A method of secure authentication comprising:
   receiving, by a server, information from a mobile device (i) identifying the mobile device and (ii) obtained by the mobile device from an identifying tag physically associated with a secure device different from the mobile device;
   accessing, by the server, a database to identify (i) a user associated with the mobile device, (ii) a secure device associated with the identifying tag, and (iii) the security policy associated with the secure device; and
   based at least in part on the mobile-device identifying information and the information obtained from the tag determining if the policy permits access by the identified user to the identified secure device, and if so, causing access to the secure device to be accorded to the user.

2. The method of claim 1, further comprising challenging the user for an authentication factor before causing access to the secure device to be accorded to the user.

3. The method of claim 1, wherein the step of causing access comprises wirelessly communicating, via wireless cell phone communication, an authentication token to the mobile device for wireless presentation by the mobile device to the secure device.

4. The method of claim 3, wherein the wireless presentation of the token by the mobile device to the secure device occurs via near-field communication.

5. The method of claim 3, wherein the wireless presentation of the token by the mobile device to the secure device occurs via point-to-point Bluetooth.

6. The method of claim 1, wherein the step of causing access comprises wirelessly communicating, from the server, an authorization directly to the secure device.

7. The method of claim 1, wherein the step of causing access comprises wirelessly communicating, via wireless cell phone communication, a secure device identifier to the mobile device for enabling the mobile device to directly communicate with the secure device.

8. The method of claim 7, wherein the secure device identifier is a Bluetooth MAC address of the secure device.

9. The method of claim 1, wherein the step of causing access comprises wirelessly communicating, by the server to the secure device, information about the user of the mobile device for enabling the secure device to authenticate the user without further communication with the server.

10. The method of claim 1, wherein the information is received from the mobile device via wireless cell phone communication.

11. The method of claim 1, wherein the identifying tag is an RFID tag, a bar code, or a quick response code.

12. The method of claim 1, wherein the secure device is located within a room in which a second secure device is located, access to the second secure device being automatically accorded upon access to the first secure device being accorded.

13. The method of claim 1, further comprising:
   receiving, by the server, information from the mobile device identifying a second identifying tag read by the mobile device;
   accessing, by the server, a second database to identify (i) a person associated with the second identifying tag, and (ii) a second security policy associated with the person; and
   if the second policy permits access by the user to a third database associated with the identified person, causing access to the third database to be accorded to the user.

14. The method of claim 13, wherein the third database stores patient medical histories.

15. The method of claim 1, further comprising challenging the user for a second authentication factor after according the user access to the secure device.

16. The method of claim 1, further comprising terminating access to the secure device.

17. The method of claim 16, wherein the termination of access is triggered by receiving, by a server, information from the mobile device identifying (i) the mobile device and (ii) the identifying tag associated with the secure device.

18. The method of claim 16, wherein the termination of access is triggered by receiving, by a server, information from a second mobile device identifying (i) the second mobile device and (ii) the identifying tag associated with the secure device.

19. The method of claim 16, wherein the termination of access is triggered by a lack of response from the mobile device after the secure device has requested communication therewith.

20. The method of claim 1 wherein access to the secure device is accorded only following sequential or simultaneous communications involving a plurality of mobile devices.

21. The method of claim 1, further comprising:
   obtaining, by the mobile device, vitals information from at least one monitor associated with a patient; and
   transmitting, to the server, data identifying the monitor and the obtained vitals information obtained from the monitor.

22. The method of claim 1, further comprising:
   receiving, by the server, information from the mobile device identifying a printer; and
   transmitting, from the server, a list of queued print jobs to the secure device,
   wherein at least one of the queued print jobs is printed using the printer.

23. A method of secure authentication comprising:
receiving, by a server, information from a mobile device (i) identifying the mobile device and (ii) obtained by the mobile device from first and second identifying tags not associated with the mobile device;
accessing, by the server, a database to identify (i) a user associated with the mobile device, (ii) first and second secure devices associated, respectively, with the first and second identifying tags, and (iii) a security policy associated with the secure devices; and
based at least in part on the mobile-device identifying information and the information obtained from the tag, determining if the policy permits access by the identified user to the identified secure devices, and if so, causing access to the secure devices to be accorded to the user.

24. A method of secure authentication comprising:
causing communications among a server and a plurality of mobile devices;
determining, by the server, whether the communications satisfy a policy; and
if so, according access to a secure resource different from the mobile devices to at least one individual associated with at least one of the mobile devices based on the policy and the communications.

25. The method of claim 24, wherein the plurality of mobile devices simultaneously communicate with the server.

26. The method of claim 24, wherein the wherein the plurality of mobile devices sequentially communicate with the server.

27. An authentication system comprising:
a server for receiving information from a mobile device identifying (i) the mobile device and (ii) an identifying tag read by the mobile device, the identifying tag being physically associated with a secure device different from the mobile device; and
a database comprising records (i) associating users with mobile devices, (ii) associating secure devices with tag identifiers, and (iii) defining a security policy associated with the secure devices,
wherein the server comprises a processor for (i) accessing the database upon receipt of the information from the mobile device, (ii) determining based thereon whether a security policy applicable to the user associated with the mobile device is entitled to access the secure device associated with the identifying tag, and if so, (iii) facilitating access to the secure device by the user.

28. The authentication system of claim 27, wherein the server is configured to wirelessly communicate with the mobile device via cell phone communication.

29. The authentication system of claim 27, wherein the server is configured to communicate with the secure device via a computer network.

30. The authentication system of claim 27, wherein the identifying tag is an RFID tag, a bar code, or a quick response code.

31. An authentication system comprising:
a server for receiving information from a mobile device identifying (i) the mobile device and (ii) an identifying tag read by the mobile device, the identifying tag being physically associated with a secure device different from the mobile device;
a secure device configured for local wireless communication with the mobile device; and
a database comprising records (i) associating users with mobile devices, (ii) associating the secure device with at least one tag identifier, and (iii) defining a security policy associated with the secure device,
wherein the server comprises a processor for (i) accessing the database upon receipt of the information from the mobile device, (ii) determining based on the information whether a security policy applicable to the user associated with the mobile device is entitled to access the secure device associated with the identifying tag, and if so, (iii) facilitating access to the secure device by the user.

32. The authentication system of claim 31, wherein the mobile device communicates with the secure device via point-to-point Bluetooth.

33. The authentication system of claim 31, wherein the mobile device communicates with the secure device via near-field communication.

34. The authentication system of claim 31, wherein the identifying tag is an RFID tag, a bar code, or a quick response code.

35. A wireless mobile device comprising a processor for:
executing a first procedure for reading an identifying tag physically associated with a secure device different from the mobile device;
executing a second procedure for transmitting information from the identifying tag and information identifying the wireless mobile device to a server, the information including (i) data identifying the mobile device and (ii) data read from the tag by the mobile device;
executing a third procedure for receiving an authentication token from the server; and
executing a fourth procedure for according access to the secure device using the token if, based at least in part on the transmitted information, a security policy associated with the secure device permits access thereto by a user of the identified mobile device.

36. The wireless mobile device of claim 35, wherein the identifying tag is read using near-field communication.

* * * * *